United States Patent
Song et al.

(10) Patent No.: US 9,513,716 B2
(45) Date of Patent: Dec. 6, 2016

(54) BIMANUAL INTERACTIONS ON DIGITAL PAPER USING A PEN AND A SPATIALLY-AWARE MOBILE PROJECTOR

(75) Inventors: Hyunyoung Song, Ithaca, NY (US); Francois V. Guimbretiere, Ithaca, NY (US); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1317 days.

(21) Appl. No.: 13/040,238

(22) Filed: Mar. 3, 2011

(65) Prior Publication Data

US 2011/0216001 A1  Sep. 8, 2011

Related U.S. Application Data

(60) Provisional application No. 61/310,657, filed on Mar. 4, 2010.

(51) Int. Cl.
    *G06F 3/033*     (2013.01)
    *G03B 21/26*     (2006.01)

(52) U.S. Cl.
    CPC ................... *G06F 3/033* (2013.01)

(58) Field of Classification Search
    CPC .......................... G06F 3/0425; G06F 3/0426
    USPC .......................................... 345/156–160, 179
    See application file for complete search history.

(56) References Cited

U.S. PATENT DOCUMENTS

| | | | |
|---|---|---|---|
| 5,414,521 A * | 5/1995 | Ansley | 348/123 |
| 5,584,552 A * | 12/1996 | Nam-Su et al. | 353/70 |
| 6,297,804 B1 * | 10/2001 | Kashitani | 345/157 |
| 7,164,811 B2 * | 1/2007 | Nathanson et al. | 382/313 |
| 2003/0165048 A1 * | 9/2003 | Bamji et al. | 361/681 |
| 2007/0159453 A1 * | 7/2007 | Inoue | 345/156 |
| 2007/0180392 A1 * | 8/2007 | Russo | 715/765 |
| 2007/0273846 A1 * | 11/2007 | Oda | 353/101 |
| 2009/0091710 A1 * | 4/2009 | Huebner | 353/28 |
| 2009/0160818 A1 * | 6/2009 | Wilde et al. | 345/173 |
| 2009/0219262 A1 * | 9/2009 | Champion et al. | 345/179 |
| 2010/0251179 A1 * | 9/2010 | Cragun | G06F 3/04812 715/834 |
| 2011/0310066 A1 * | 12/2011 | Fermgard et al. | 345/179 |

OTHER PUBLICATIONS

Song et al., PenLight: Combining a Mobile Projector and a Digital Pen for Dynamic Visual Overlay, CHI Apr. 6, 2009, pp. 143-152; http://www.cs.cornell.edu/~francois/Papers/p143-song.pdf.*

* cited by examiner

*Primary Examiner* — Amit Chatly
(74) *Attorney, Agent, or Firm* — Artegis Law Group, LLP

(57) ABSTRACT

One embodiment of the present invention sets forth a technique for providing an end user with a spatially-aware projector combined with a spatially-aware digital pen for use in a design environment. Paper documents are augmented to allow a user to access additional information and computational tools through projected interfaces. Virtual ink may be managed in single and multi-user environments to enhance collaboration and data management. The spatially-aware projector pen provides end-users with dynamic visual feedback and improved interaction capabilities.

22 Claims, 19 Drawing Sheets

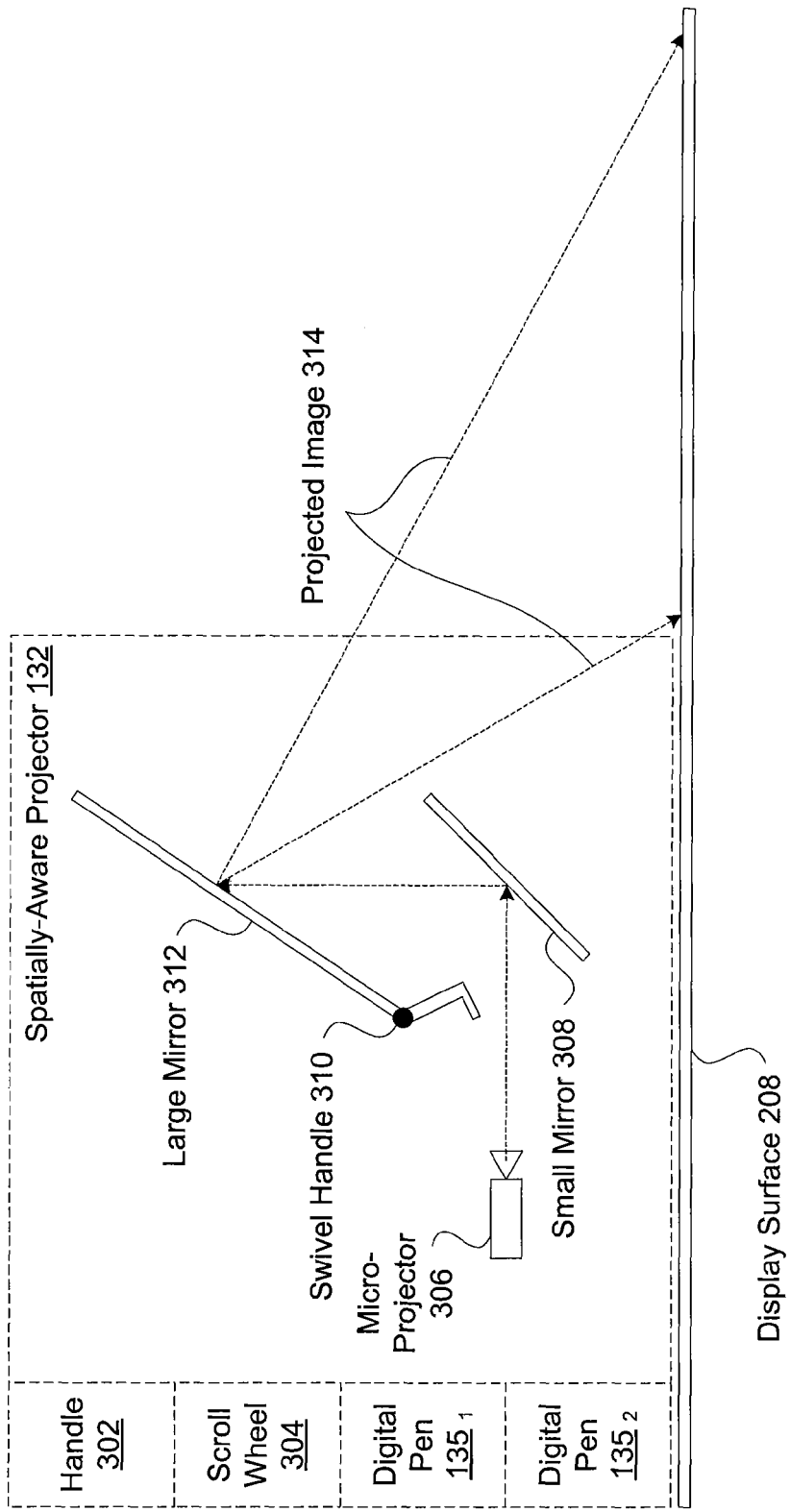

BIMANUAL INTERACTIONS ON DIGITAL PAPER USING A PEN AND A SPATIALLY-AWARE MOBILE PROJECTOR

CROSS-REFERENCE TO RELATED APPLICATIONS

This application claims benefit of U.S. provisional patent application Ser. No. 61/310,657, filed on Mar. 4, 2010, which is hereby incorporated herein by reference.

BACKGROUND OF THE INVENTION

Field of the Invention

Embodiments of the invention relate generally to computer software and, more specifically, to a method and system for bimanual interactions on digital paper using a digital pen and a spatially-aware mobile projector.

Description of the Related Art

The field of augmented reality has demonstrated the interesting properties which arise from augmenting physical artifacts with virtual imagery. In particular, there are many benefits in overlaying virtual information in situ of physical environments when a digital system is aware of its location. This idea has been extended with different display and tracking technologies to not only visualize, but also to manipulate virtual imagery in the context of a physical environment. Paper has been one of the most popular mediums to virtually augment due to its unique physical properties such as ubiquity, mobility, and scalability.

Recently, virtual interactions on paper gained further interest due to the introduction of emerging digital pen technologies such as Anoto®. An Anoto®-based digital pen can capture and interpret, via a camera embedded therein, what users write onto surfaces. When combined with visual feedback, the pen can serve as a proxy to access virtual information associated with the physical paper. The virtual information can then be updated on paper and the next iteration begins. Depending on the properties of the visual feedback, different virtual interactions on paper are possible. One example is AutoDesk's® PenLight, described in U.S. patent application Ser. No. 12/537,013, entitled "A Spatially-Aware Projection Pen," which simulates a mobile projector mounted on a digital pen and allows a dynamic visual overlay to be displayed on top of a surface. This increases the "functionality" of the paper, allowing a user to interact with virtual content such as ink and auxiliary data. Though PenLight's integration of pen input and projector output into a single device improves the mobility of the device, it disadvantageously fixes the pen tip to a single point within the projected image. As a result, users cannot make annotations and overlay virtual content independent of one another.

SUMMARY OF THE INVENTION

One embodiment of the present invention sets forth a spatially-aware projector system, comprising a first position tracking mechanism configured to provide position data related to a current position of the spatially-aware projector within a display surface, and a projection unit configured to display a projected image generated from design data retrieved from memory based on the position data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3B illustrates a detailed view of a spatially-aware projector according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
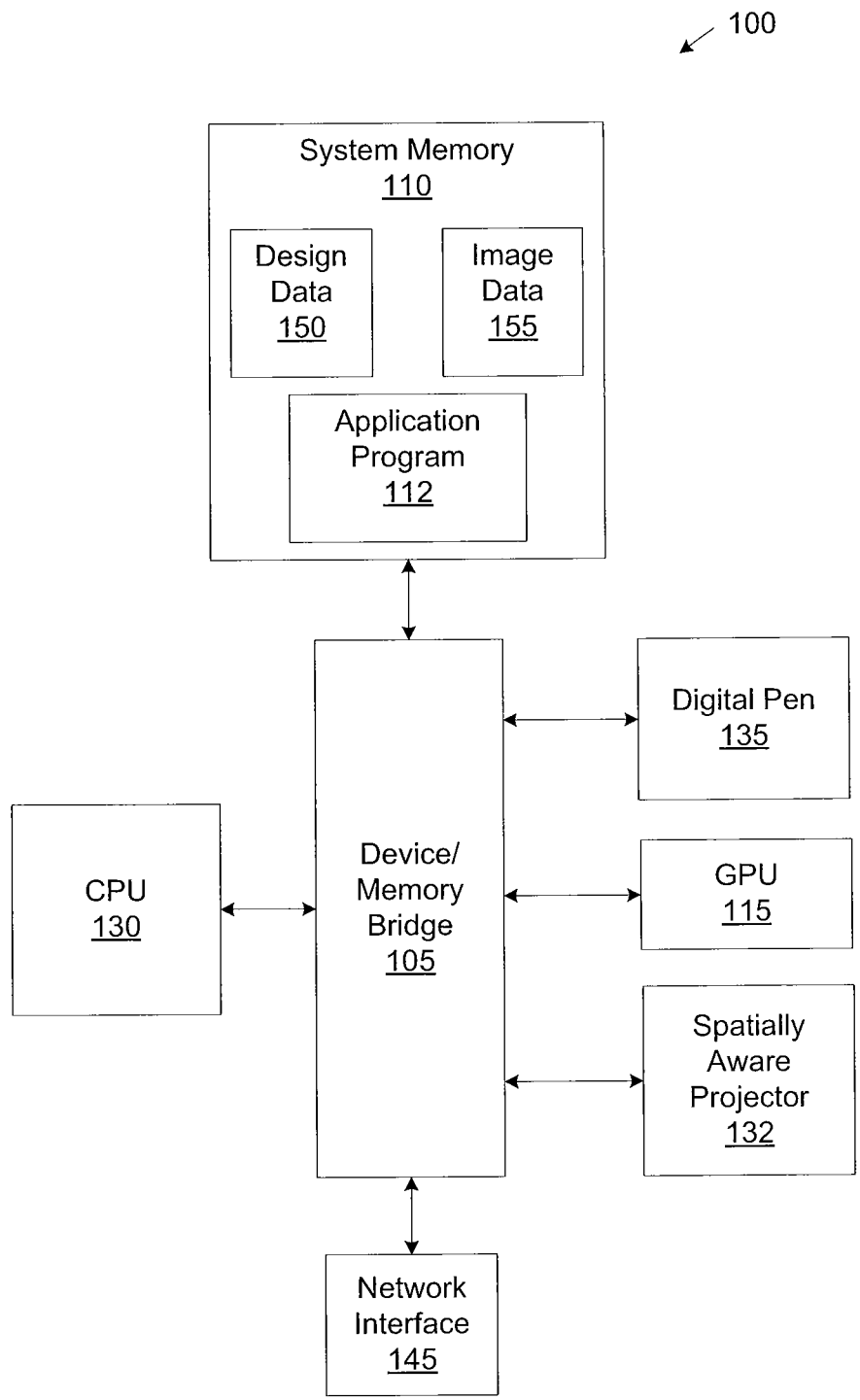
FIG. 1 illustrates a system configured to implement one or more aspects of the present invention.

FIG. 1 illustrates a system 100 configured to implement one or more aspects of the present invention. The system 100 includes, without limitation, a central processing unit (CPU) 130, a system memory 110, a graphics processing unit (GPU) 115, a device/memory bridge 105, a network interface 145, a digital pen 135, and a spatially-aware projector 132. The spatially-aware projector 132 is configured to be grasped by a non-dominant human hand while the digital pen 135 is configured to be grasped by a dominant human hand. The CPU 130 communicates with the system memory 110 via the device/memory bridge 105, which may be, e.g., a Northbridge device or subsystem. System memory 110 is configured to store application programs, as well as data used by or generated by the CPU 130. In particular, system memory 110 is configured to store design data 150, such as computer-aided design drawings and information that is accessed by the application program 112. System memory 110 is also configured to store image data 155 for display by the spatially-aware projector 132. The image data 155 may be produced by the CPU 130 or a discrete GPU 115 based on design data 150 and/or data received via the spatially-aware projector 132 and the digital pen 135.

System memory 110 is coupled to the device/memory bridge 105 via a system memory bus 150. The device/memory bridge 105 may be coupled to the GPU 115 that incorporates real-time image rendering means for rendering both three-dimensional (3D) and two-dimensional (2D) images. The CPU 130 or GPU 115 delivers pixel data to the spatially-aware projector 132. In some embodiments, the integrated circuit implementing the CPU 130 may incorporate additional functional blocks, such as the device/memory bridge 105 and GPU 115.

The device/memory bridge 105 is also coupled to the network interface 144, the digital pen 135, and the spatially-aware projector 132. The network interface 144 provides network connectivity to other computers in local or remote locations using any suitable technology, preferably a wireless technology. In particular, portions of design data 150 and image data 155 may be output to remote users via the network interface 144. Similarly, data received from a remote user via the network interface 144 may be displayed and/or stored as design data 150 or image data 155.

Other components (not explicitly shown), including USB or other port connections, CD drives, DVD drives, film recording devices, and the like, may also be connected via network interface 145. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In one embodiment, system memory 110 is configured to store a graphics modeling or authoring application program 112 that is configured to access the design data 150 to provide image data 155 for display via spatially-aware projector 132 and use information acquired by the digital pen 135 and the spatially-aware projector 132 to display a user-interface or image data.

Figure 2:
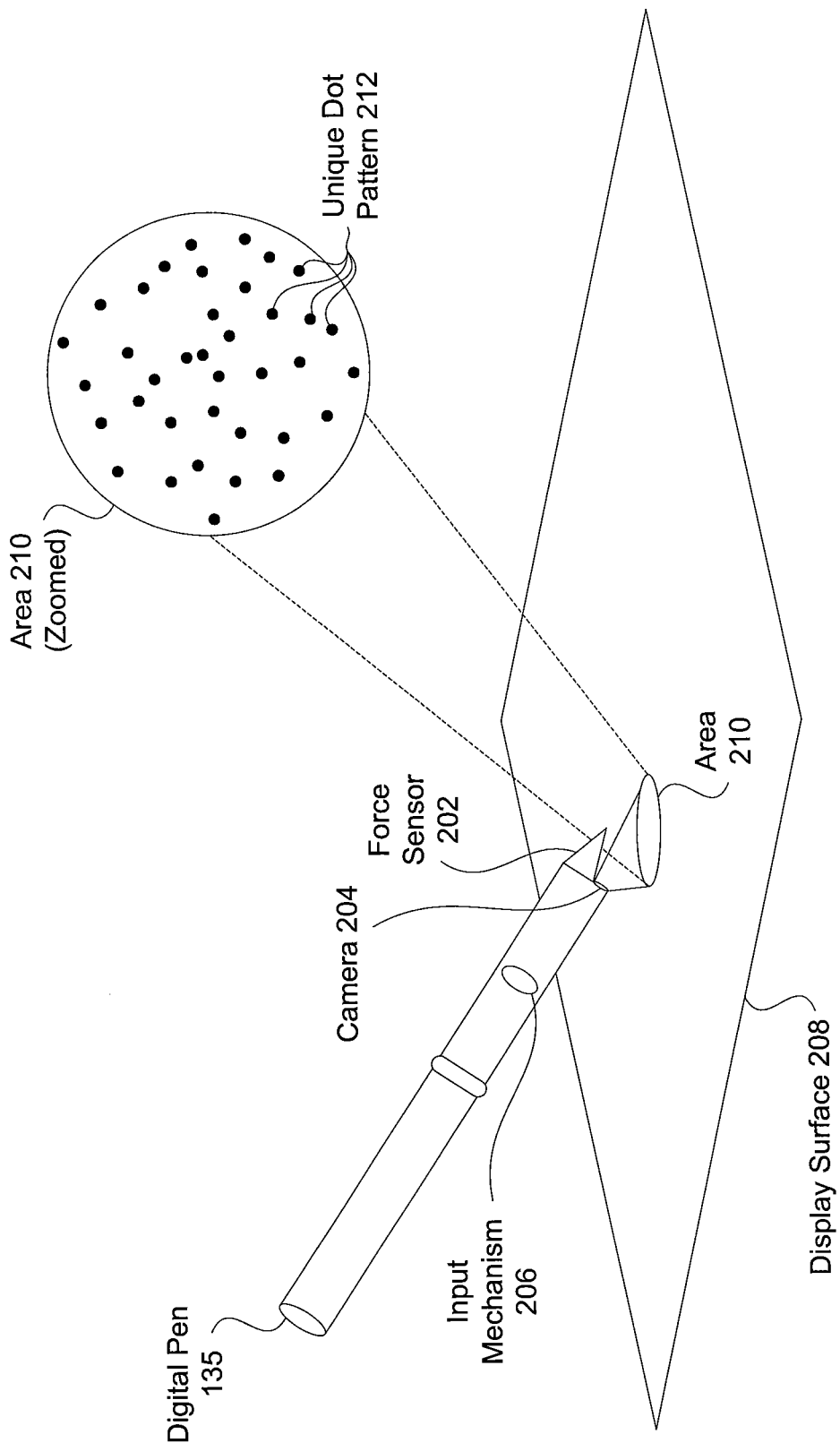
FIG. 2 illustrates a detailed view of a digital pen according to one embodiment of the present invention.

FIG. 2 illustrates a detailed view of the digital pen 135 according to one embodiment of the present invention. As shown, the digital pen 135 includes a force sensor 202, which indicates when the tip of the digital pen 135 is in contact with a display surface 208 and may be used to record pen strokes. An ink reservoir may be configured to deposit physical ink on the display surface when the tip of the digital pen 135 is in contact with a surface.

A camera 204 is also included in the digital pen 135 and is positioned to enable 2D tracking using patterns printed on the display surface 208. In one example, dot-pattern technology is used to provide the 2D tracking, where a unique dot pattern 212 is identified by camera 204 while scanning area 210. The camera 204 may also be used to enable 3D optical tracking using traceable patterns to retrieve camera calibration parameters to determine 3D location and orientation. The patterns may also represent a hierarchical encoding pattern which allows the camera to cover a wide range of distances from the display surface 208. Additional patterns may be printed on the display surface 208 in infrared ink to be less distracting to the user.

In other embodiments, the digital pen 135 may include alternative tracking mechanisms to the camera 204. For example, any type of proximity sensor, e.g., electromagnetic sensors may be included in the display surface 208 to detect a location of digital pen 135. This configuration would advantageously enable the spatially aware projector 132 to be lifted a substantial distance from the display surface 208 while maintaining overall functionality and providing a larger projected image onto the display surface 208.

An input mechanism 206 is further included in digital pen 135 and may be implemented using a button that is configured to be activated and/or deactivated by a user, as described in further detail herein.

Figure 3A:
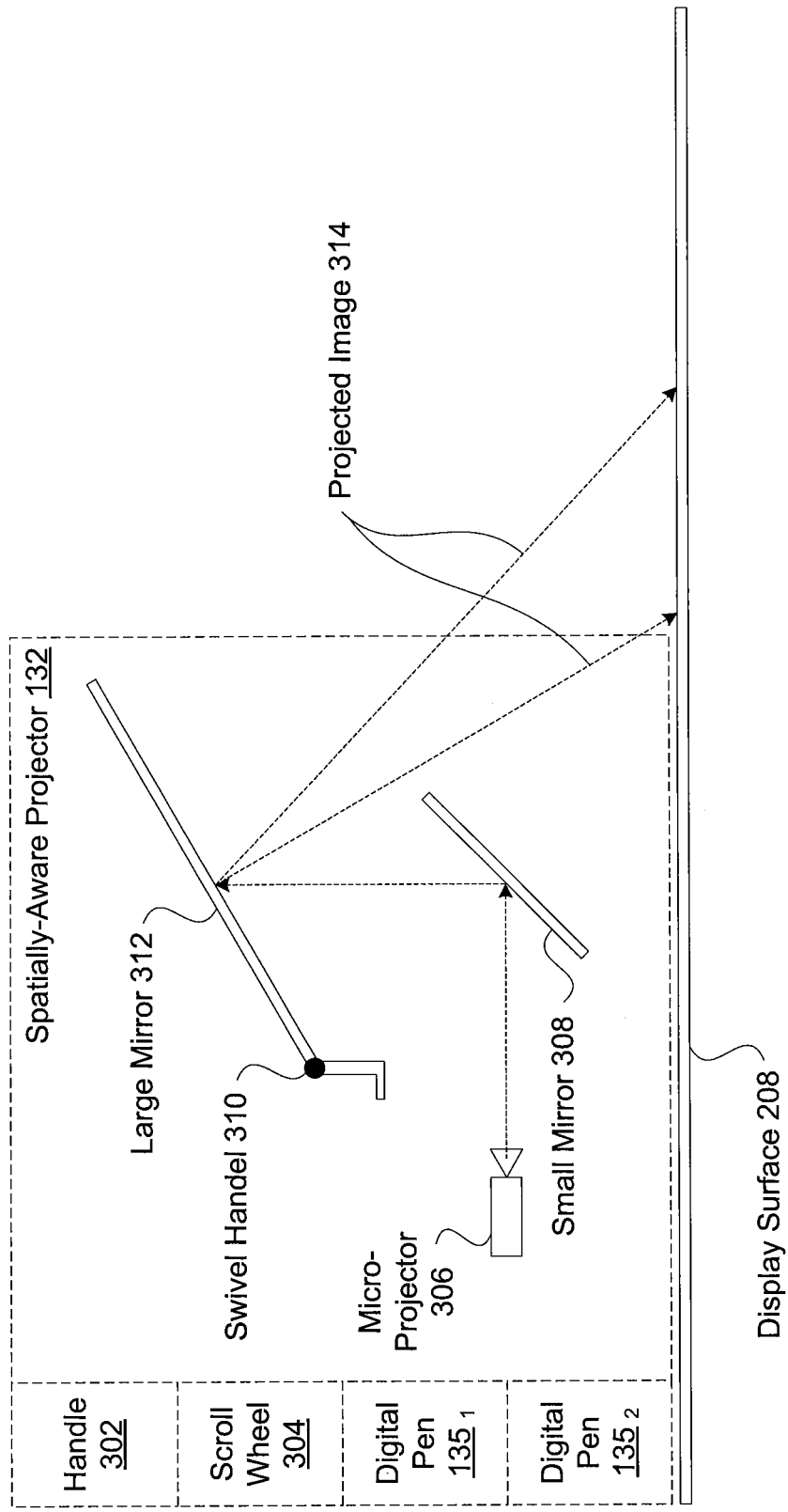

FIGS. 3A-3B illustrate a detailed view of the spatially-aware projector 132 according to one embodiment of the present invention. In order for the spatially-aware projector 132 to display the design data 150 and/or image data 155 as a visual overlay in the context of a paper document, the application program 112 needs to be aware of the spatial location of the spatially-aware projector 132 and the digital pen 135 relative to the display surface 208. Capturing the location of the spatially-aware projector 132 and/or the spatially-aware pen 135 on the display surface 208 allows the spatially-aware projector 132 to display virtual information which is relevant to the existing physical content on the paper. The virtual information may be read from design data 150 or information previously captured by digital pen 135 from pen strokes stored as image data 155. The digital pen 135 increases the user's ability to work with functionality that requires visual feedback, such as viewing the results of computations, and overlaying contextual information onto the digital paper 208 via spatially-aware projector 132.

In one embodiment, the spatially-aware projector 132 includes a handle 302, a scroll wheel 304, a digital pen 135$_1$, a digital pen 135$_2$, a micro-projector 306, a small mirror 308, a swivel handle 310, and a large mirror 312. The handle 302 may be grasped by a hand of the user to navigate the spatially-aware projector 132 across the display surface 208. The scroll wheel 304 may be implemented using a scroll wheel of a mouse, and is used to, e.g., cause elements included within a projected image 314 to be scaled up or down. The projected image is dynamically updated to display virtual layers, as described in further detail below in conjunction with FIG. 6. Input received via digital pens 135$_1$ and 135$_2$ provides both a position and angle of the projector with respect to the display surface 208. In other embodiments, alternative tracking mechanisms may be included within the spatially-aware projector 132, such as the proximity sensors described above in conjunction with FIG. 2. Projected image 314 is displayed via micro-projector 306, small mirror 308 and large mirror 312.

The angle of large mirror 312 is adjustable via the swivel handle 310 to increase or decrease the size of the projected image 314. In this way, a user of system 100 is advantageously able to focus his or her work across a small or large portion of display surface 208, as illustrated in FIG. 3B. Note that the position of micro-projector 306 and small mirror 308 are not fixed and may also be adjusted, either alone or in combination, to influence projected image 314.

In addition, if a laser-based pico projector is used, the scanning pattern produced by the pico projector may be modified to reduce artifacts that are often visible when the large mirror 312 is angled to increase the size of the projected image 314. For example, the spatially-aware projector 132 may include a mechanical controller, that, when adjusted, changes the spread between each raster line that is produced by the laser-based pico projector. This may be accomplished, for example, by modulating X and Y axis-based oscillating mirrors that relay the laser beam to different x,y coordinates of the large mirror 312. Moreover, the oscillating frequency of these can be modified on demand using acousto-optic modulators. As a result, the artifacts may either be reduced or eliminated entirely.

Figure 4:
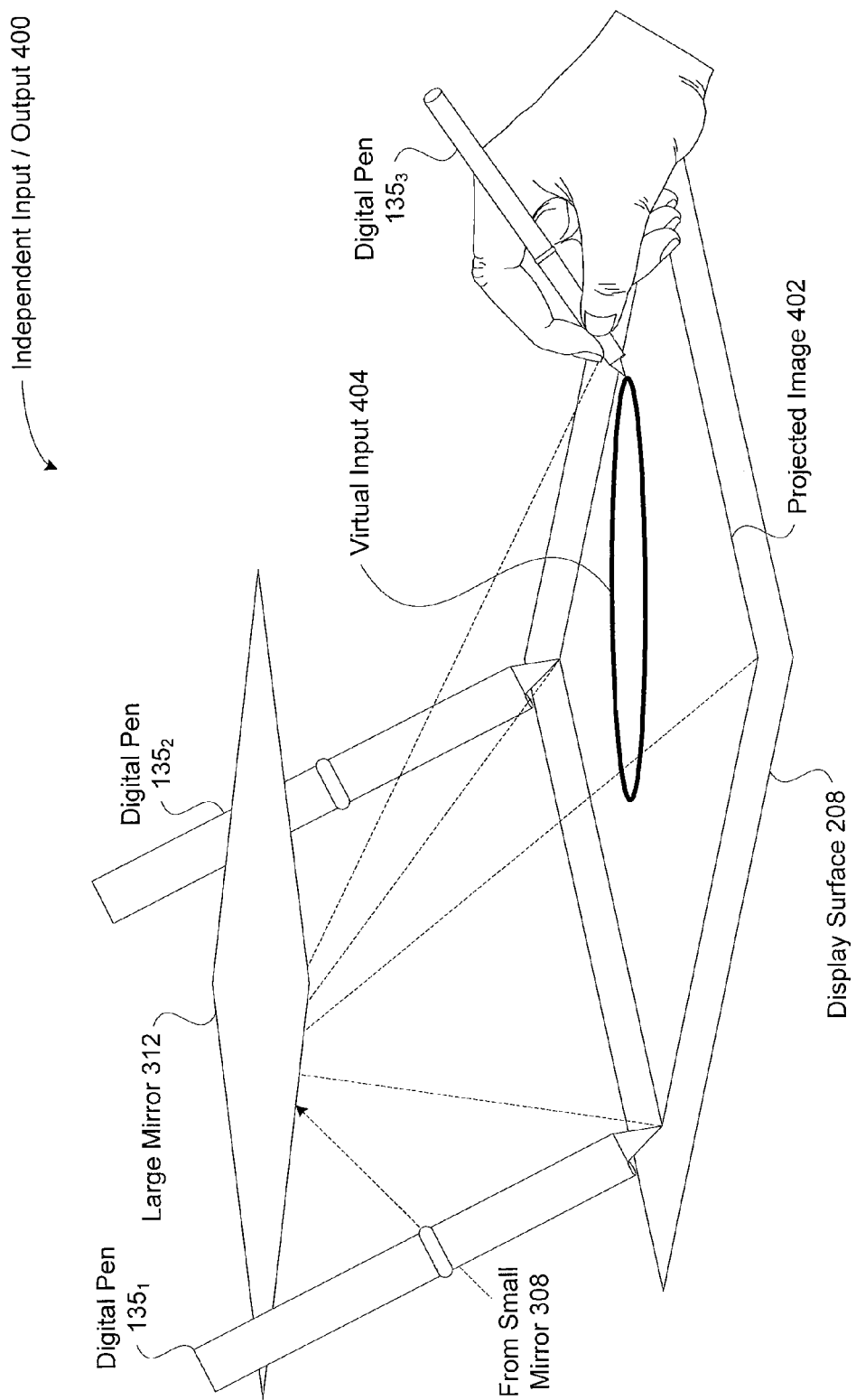
FIG. 4 illustrates an independent input/output technique according to one embodiment of the present invention.

FIG. 4 illustrates an independent input/output technique 400 according to one embodiment of the present invention. As shown, the spatially-aware projector 132 produces a projected image 402 on display surface 208. The location and orientation of the spatially-aware projector 132 and the digital pen 135 with respect to display surface 208 is carefully considered, since they affect the overall operation of the system in several ways. Digital pen $135_3$ provides a direct link between input, e.g., pen strokes, illustrated as virtual input 404, and output, e.g., projected image 402. Importantly, decoupling the digital pen 135 and spatially-aware projector 132 allows for independent input and output. For example, the projected image 402 can be stationary while the digital pen 135 is used. In other words, the digital pen 135 and the spatially-aware projector 132 can be operated simultaneously and independently from one another. Additionally, multiple users may share the same display surface 208 and collaborate by each providing input via additional spatially-aware digital pens $135_{4-X}$. Remote users may also provide input and see the same projected image 402 on a remote display surface 208.

Figure 5:
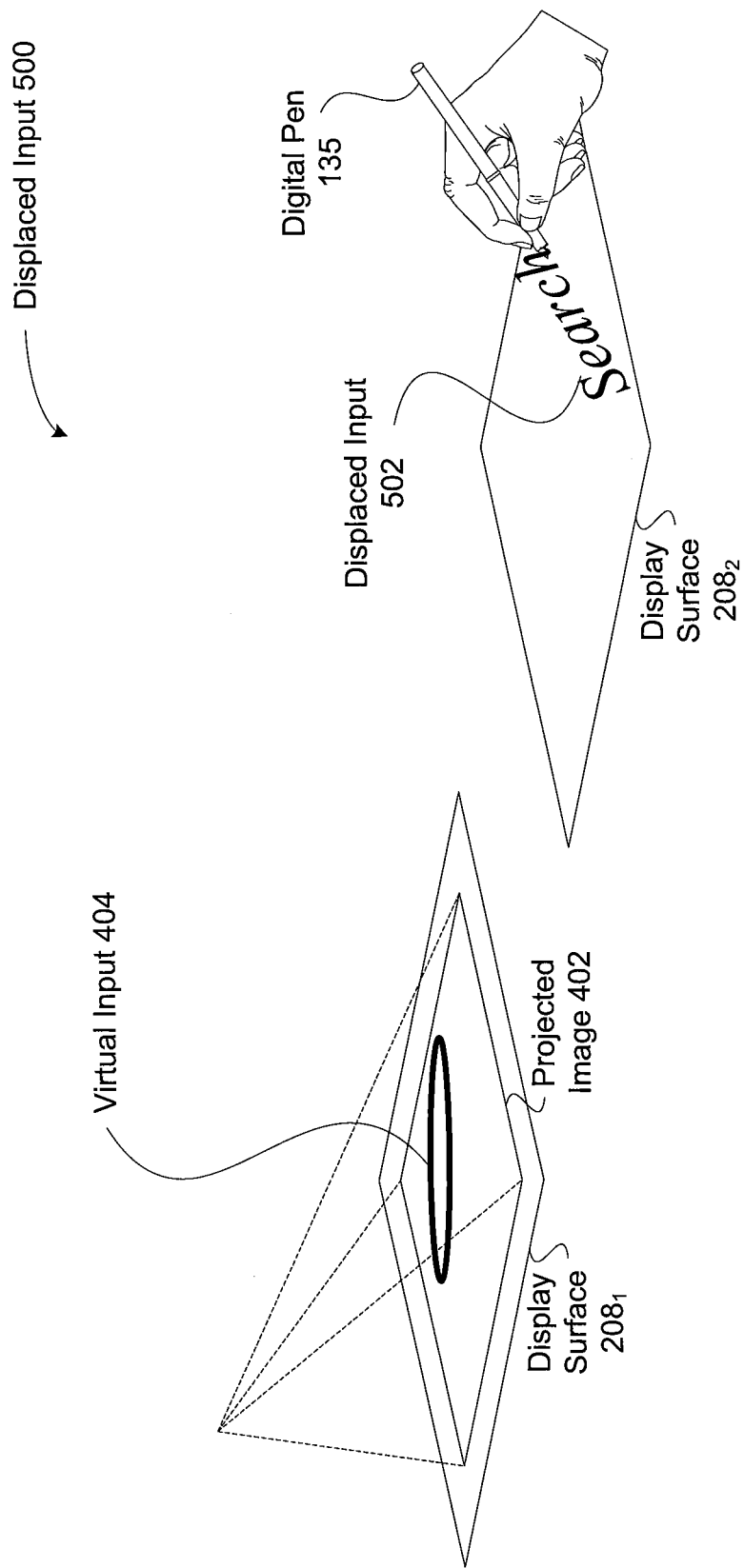
FIG. 5 illustrates a displaced input technique according to one embodiment of the present invention.

FIG. 5 illustrates a displaced input technique 500 according to one embodiment of the present invention. Another property resulting from decoupling the digital pen 135 and spatially-aware projector 132 is the capability to provide input via the digital pen 135 outside of the projected image 402. For example, the user can write a "search" keyword via displaced virtual input 502 outside the projected image 402 on a separate display surface $208_2$ and the search results can be included in the projected image 402. Furthermore, users can interact with the projected image 402 on a separate display surface 208 to interact with virtual display elements located thereon.

Figure 6:
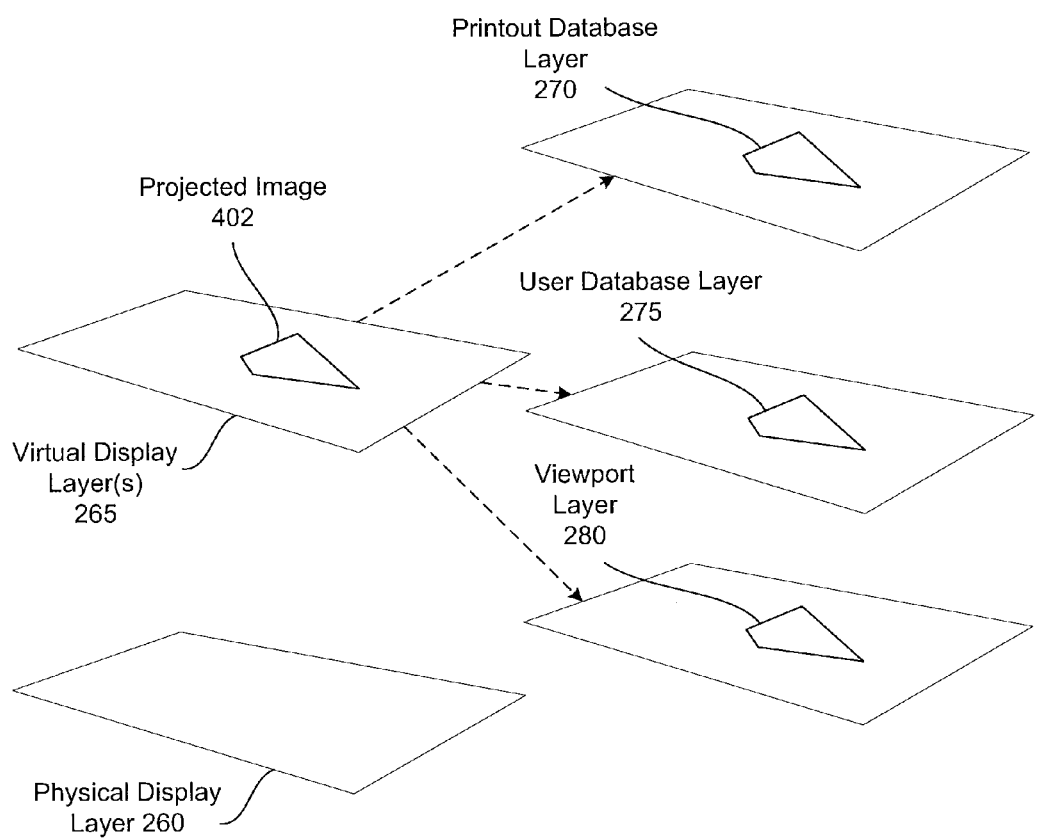
FIG. 6 illustrates different virtual layers, according to one embodiment of the present invention.

FIG. 6 illustrates different virtual layers, according to one embodiment of the present invention. The display layers include the physical display layer 260 and the virtual display layer(s) 265. The virtual display layers 265 may include multiple separate virtual layers that are overlaid. Each virtual layer may include one or more of user printout database layers 270, user database layer 275, and/or viewport layer 280. The physical display layer 260 is the layer which physically exists on the display surface 208 and may include a variety of different elements. Examples of elements include printed content, such as a diagram or two-dimensional building layout, ink created by the user, and user interface elements, such as menus and icons, preprinted on the physical display layer 260.

Above the physical display layer 260 are one or more virtual display layers 265 that may be combined to produce the projected image 402. A variety of display elements may be projected onto the virtual display layers 265. Printout database layer 270 contains auxiliary data that is displayed in the context of the printed content. For example, if a map is printed on a piece of paper, the printout database consists of vector images and text labels of either printed content or electronically stored content. Display elements within the printout database layer are locked on-surface and aligned with the underlying printout. Printout database layer 270 may be useful for displaying aspects of the design data 150 that are not included in the physical display layer 260. For example, when multivalent documents that consist of multiple abstract layers of distinct—but closely coupled content—are used, then only some of the abstract layers may be included in physical layer 260. Multivalent documents are especially prevalent in the application domain of architecture and three-dimensional modeling, e.g., different floor plans, section views, and additional metadata to describe materials and processes.

User database layer 275 includes any new virtual display element, which is added by the user. For example, when a user creates ink (annotation or sketching) on top of the paper, the stroke is inserted into this layer. The contents of this layer are also locked on-surface. The most basic functionality of the digital pen 135 is creating virtual and/or physical ink. The digital pen 135 enables users to create and manage virtual ink that users can then make use of in different functions, such as tracing and drawing virtual guides. In some embodiments, the input mechanism 206 is used to change from a pen tip with physical ink to a pen tip using virtual ink that is displayed within the projected image 402. When virtual ink is enabled, all pen strokes are added to the virtual ink display layer 265, in the location of the display surface in which they are created. The user database layer 275 may be stored in image data 155 or design data 150. Hence, the annotations are added to only the virtual display layer 265. This allows a user to annotate a blueprint without altering the original document.

Users can trace over both physical and virtual content within projected image 402 to produce trace data that is captured and stored in image data 155. The trace data may be applied to different special locations within the display surface 208. Users may also load existing virtual templates to trace out with physical ink input. The resolution and size of the virtual content being traced may be adjusted via, e.g., the scroll wheel 304, or by displaying a virtual menu in projected image 402 that may be navigated using a digital pen 135.

Instead of tracing, virtual guides may be created to aid in generating a physical sketch. Such grids and guides are widely used in image editing applications, but unavailable when working on physical paper. To create a geometric guide, the user can select the line circle, rectangle, or grid menu display element, as described in further detail below in conjunction with FIG. 7. Instead of entering points that define the geometry, the user may draw a similar shape and the digital pen 135 will approximate the selected shape. For example, the user can draw a circle using the digital pen 135 on the display surface 208, and the location of digital pen 135 relative to the display surface 208 determines the center point and the radius. In grid mode, users may draw a rectangle that serves as the unit rectangle shape of the grid. Once the digital pen 135 is lifted, the entire virtual layer is covered with a self replicating grid layout.

Viewport layer 280 contains global user-interface controls that enable a user to change the settings of the printout database layer 270 and the user database layer 275. To keep these elements available at all times, viewport layer 280 is not bound to a specific location of the display surface 208, but instead locked in-hand. Note that the printout database layer 270 and user database layer 275 are page-dependent while the viewport layer is application-dependent. Hence, when the digital pen 135 and/or spatially-aware projector 132 are placed on a different page, the spatially-aware projector 132 displays different content, but the same user-interface controls. An exemplary user-interface is described in detail below in conjunction with FIG. 7.

Figure 7:
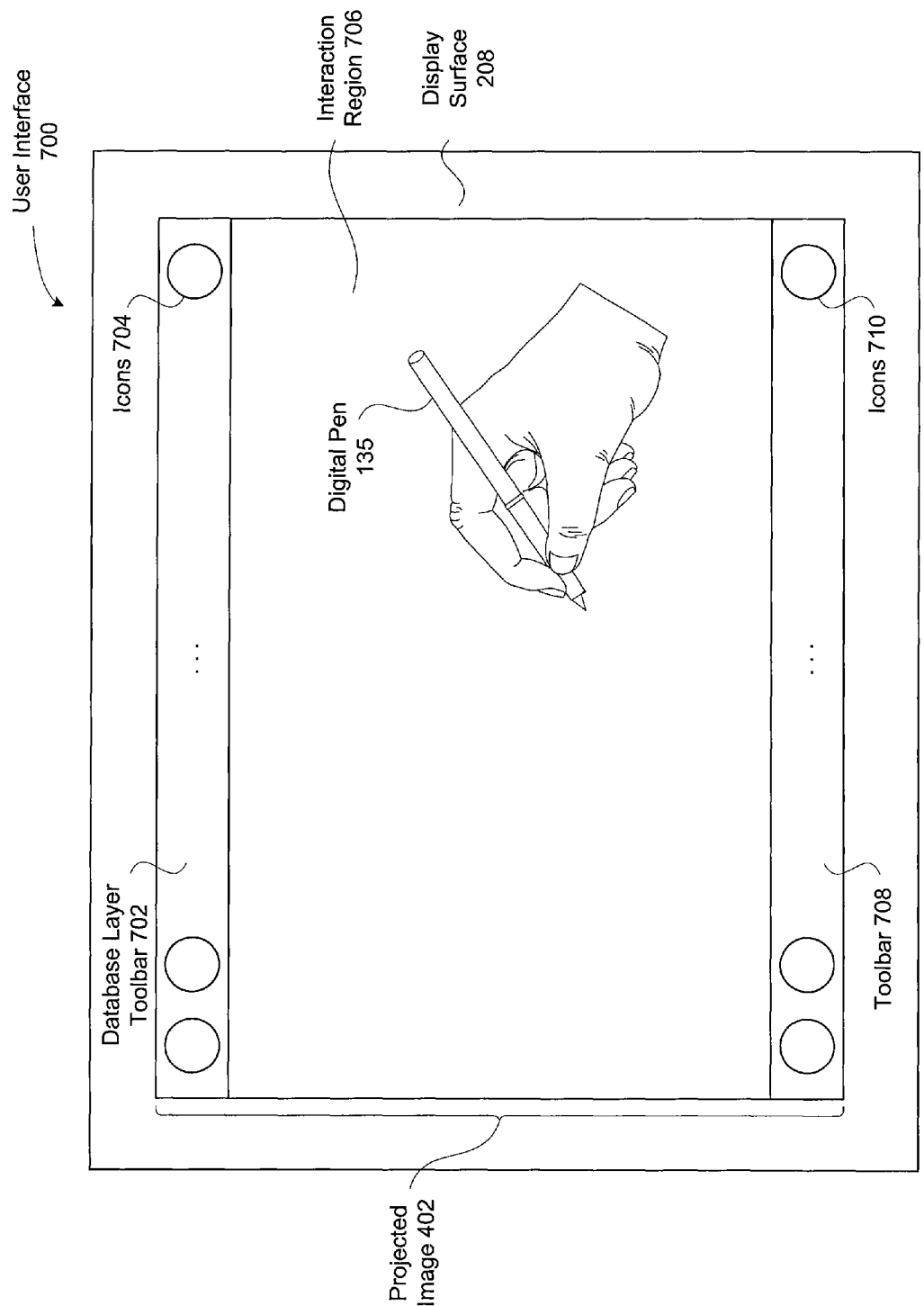
FIG. 7 illustrates a user interface that is projected onto display surface according to one embodiment of the present invention.

FIG. 7 illustrates a user interface 700 that is projected onto display surface 208 according to one embodiment of the present invention. As shown, user interface 700 is included in projected image 402 and allows for display, combination, and/or manipulation of the virtual display layers 265 displayed within the interaction region 706. To access and control system features, the spatially-aware projector 132 displays the user interface 700. To manipulate virtual content displayed within projected image 402, contextual marking menus can be displayed within the viewport layer 280, thereby providing the user with a diverse set of command execution options. The user interface 700 includes one or more database layer toolbar 702 icons 704 in the top border of the projected image 402, and one or more icons 710 in the toolbar 708 included in the bottom border of the projected image 402. The database layer toolbar 702 allows users to toggle the visibility of the printout database layer 270 and the user database layer 275. Additionally, touching and holding the digital pen 135 to the display surface 208 causes a marking menu (not shown) to be displayed within interaction region 706 and enables selection of various menu display elements, as described in further detail below in conjunction with FIGS. 8A-8B. For example, if working with a college campus map, layers such as "library", "dining", and "overview" could be menu display elements in the marking menu that could be activated or deactivated. Icons 710 included in toolbar 708 may be used to, e.g., modify colors of virtualized data, copy and paste virtualized data, perform search functions, enable camera view, and/or operate drafting tools, as described in further detail below.

Figure 8A:
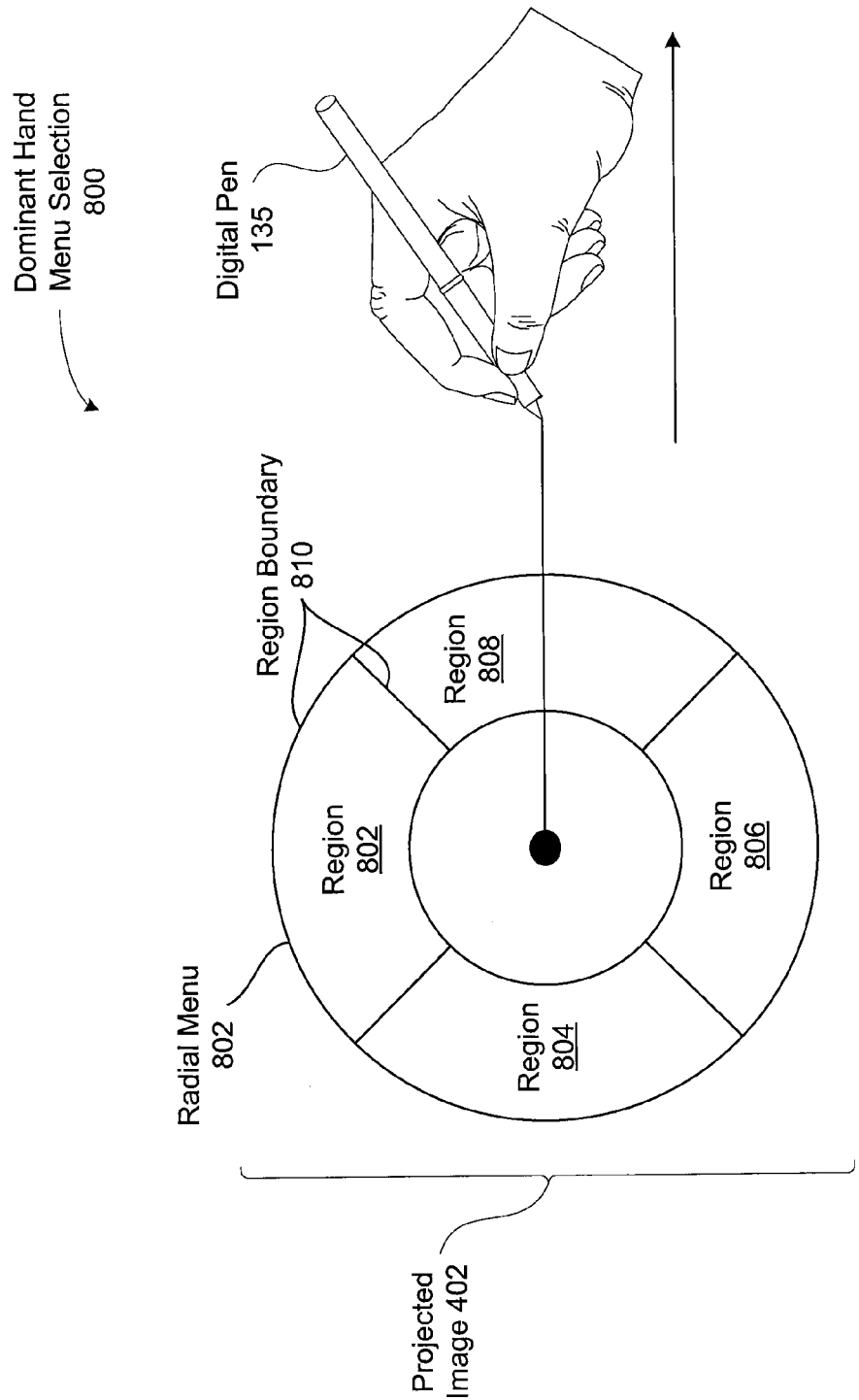
FIGS. 8A-8B illustrate a dominant hand menu selection performed via a radial menu that is included in a projected image according to one embodiment of the present invention.

FIG. 8A illustrates a dominant hand menu selection 800 performed via a radial menu 802 that is included in projected image 402 according to one embodiment of the present invention. The radial menu 802 may be implemented using hierarchy to access various functions of the system. The radial distribution of menu display elements in regions 802, 804, 806, and 808 that are separated by region boundaries, e.g., region boundary 810, simplifies use of the radial menu 802 since users only need to remember what direction to move towards. Here, a virtual cursor is bound to the tip of the digital pen 135, and is used to control the selection of regions 802, 804, 806 and 808. Users can access the radial menu 802, e.g., by activating the input mechanism 206 on digital pen 135 to cause the top level of the radial menu 802 to be displayed in virtual display layers 265. In contrast, conventional digital pen menu systems rely on menus that are preprinted on the display surface.

Figure 8B:
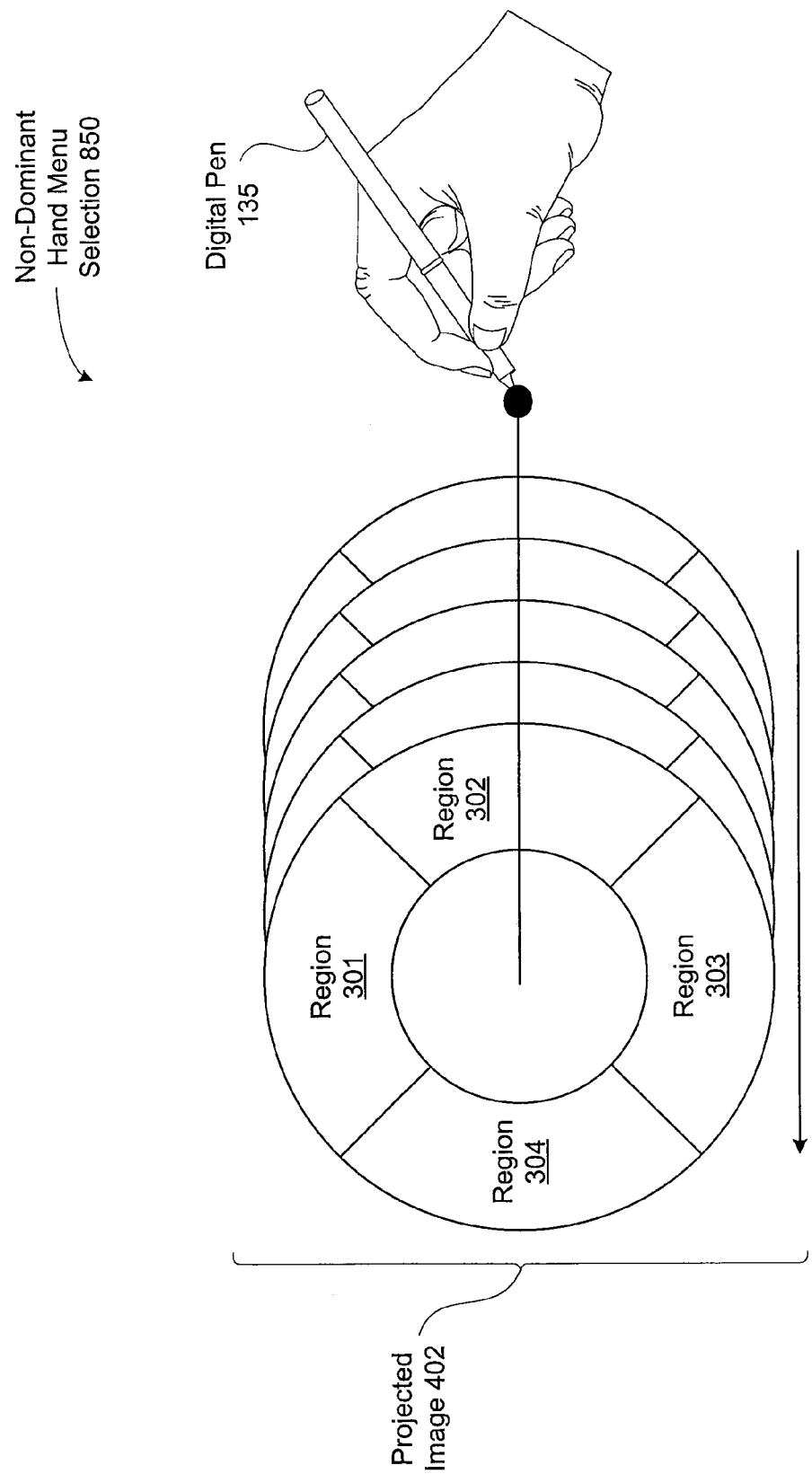

The user can select a menu display element in two ways, as illustrated in FIGS. 8A-8B. The first method involves a dominant hand menu selection technique 800, where the user can use a traditional method of moving the digital pen 135 in the direction of the menu display element, as illustrated in FIG. 8A. Alternatively, the user can use a non-dominant hand menu selection technique 850, illustrated in FIG. 8B. Here, user instead moves the spatially-aware projector 132 with the non-dominant hand (i.e., the hand that is not holding the digital pen 135) in the opposite direction of the menu display element while keeping the digital pen 135 fixed and pressed against the display surface 208, thereby repositioning the menu display element under the pen tip. Advantageously, the non-dominant hand menu selection technique 850 allows users to perform menu display element selections without leaving a physical ink trail on the display surface 208.

Figure 9:
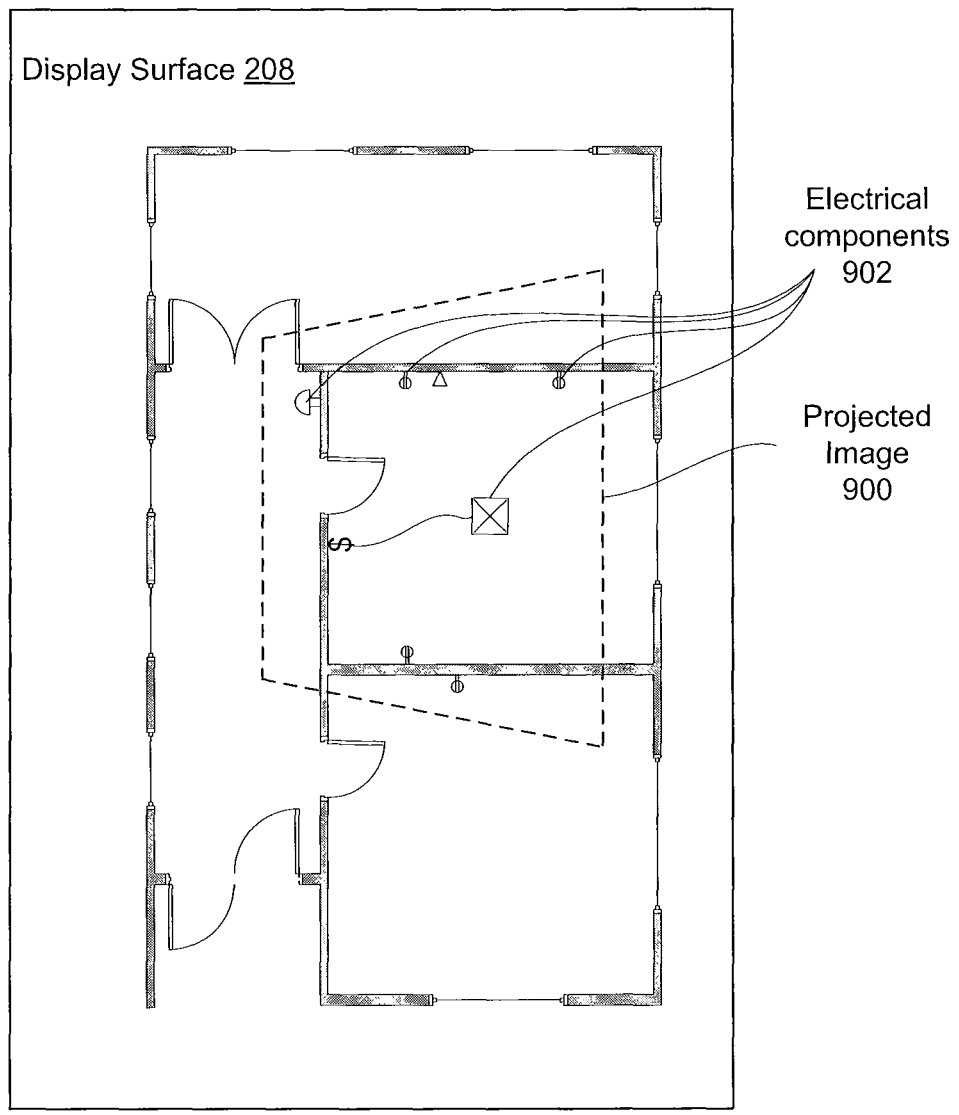
FIG. 9 illustrates a display surface that includes a floorplan that is overlaid with a projected image that displays virtual content according to one embodiment of the present invention.

FIG. 9 illustrates a display surface 208 that includes a floorplan that is overlaid with a projected image 900 that displays virtual content according to one embodiment of the present invention. The projected image 900 includes electrical components 902. Note that the electrical components 902 are only visible within the projected image 900. In other embodiments, the projected image 900 may include additional components or additional layers, e.g., heating, ventilation, mechanical, lighting, and the like.

The overlaid content or the original physical content may be copied to another location on display surface 208 to be overlaid. The user enters a copying mode using the radial menu 802 and indicates an area using the digital pen 135 to specify a contextual parameter of the projected image 900 or the image printed on the display surface 208. The user then enters a pasting mode using the radial menu 802, and the copied content is displayed using the locked in-hand metaphor and copied when the user engages the input mechanism 206.

Figure 10:
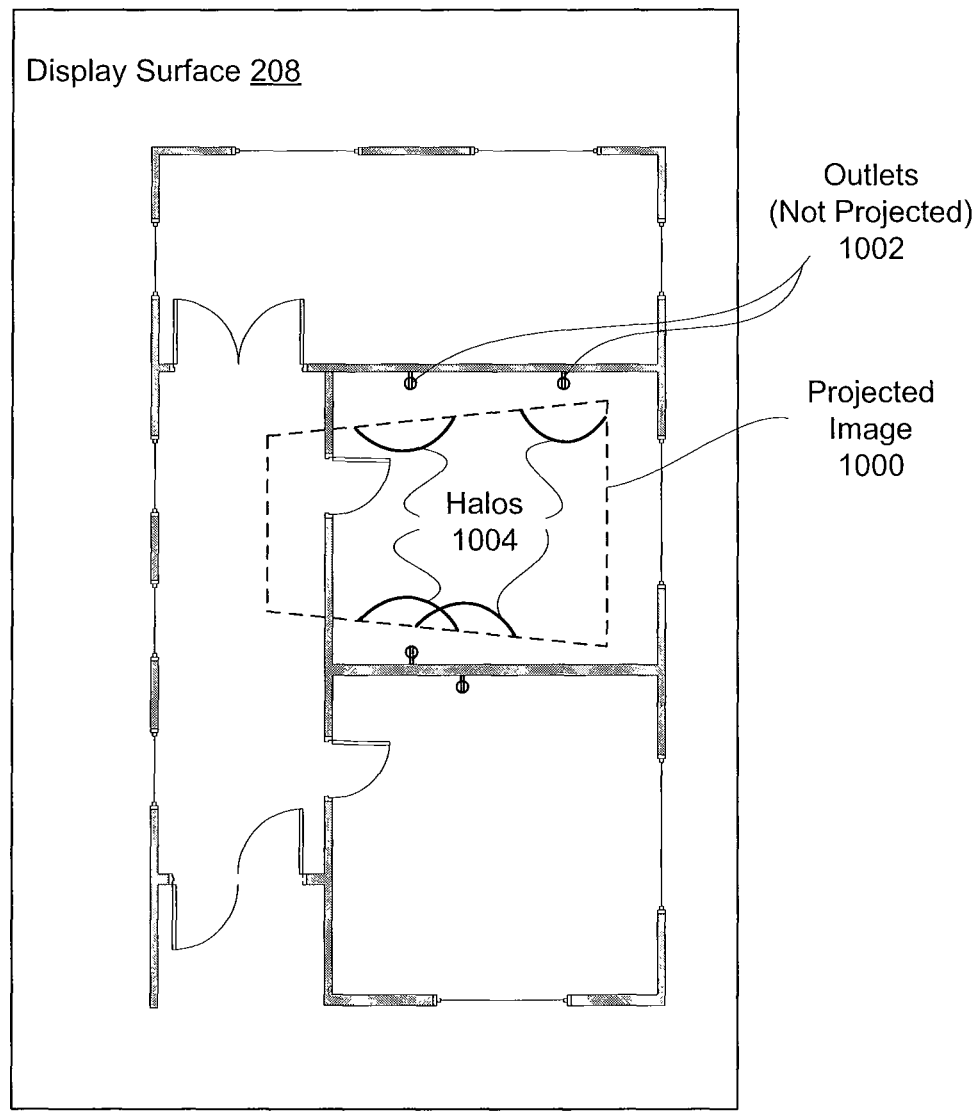
FIG. 10 illustrates a display surface that includes a floorplan that is overlaid with a projected image that hints at virtual content according to one embodiment of the present invention.

FIG. 10 illustrates a display surface 208 that includes a floorplan that is overlaid with a projected image 1000 that hints at virtual content according to one embodiment of the present invention. The virtual display layers 265 enable computations to be performed and the results displayed in the contexts of the user's workspace. The user may perform a measurement query by selecting a particular element to be measured using the spatially-aware projector 132 and/or digital pen 135 and engaging a dimension tool to overlay the measurement information. Using the radial menu 802, the user can choose to measure a distance, path length, area, or volume. Alternatively, the user may create a line or bounding box using the digital pen 135, where the measurements of the line or bounding box are displayed in the projected image 1000. The measurement computation is displayed by the spatially-aware projector 132 within the projected image 1000.

A search command may allow users to search for elements that exist within the virtual display layers 265. The user can perform the query in two ways. First, they can choose from a list of query elements, e.g., sprinklers, outlets, and the like, in the search menu provided by the radial menu 802 as described above. Alternately, the user can directly select an instance of an element on display surface 208 or within projected image 1000 using the digital pen 135. For example, the user may perform a query to search for electrical outlets. In response, the outlets 1002—which are outside of the projected image 1000—are hinted to by halos 1004, where each halo corresponds to an outlet that is nearby, but not within, the projected image 1000. Halos 1004 may guide the user to additional instances of the element that was searched, allowing the user to find elements of interest faster. The user can also adjust the swivel handle 310 to increase the size of the projected image 1000 to navigate toward or to display the elements corresponding to one or more of the halos 1004. Alternatively, the user can relocate the spatially-aware projector 132 perform the navigation.

Figure 11:
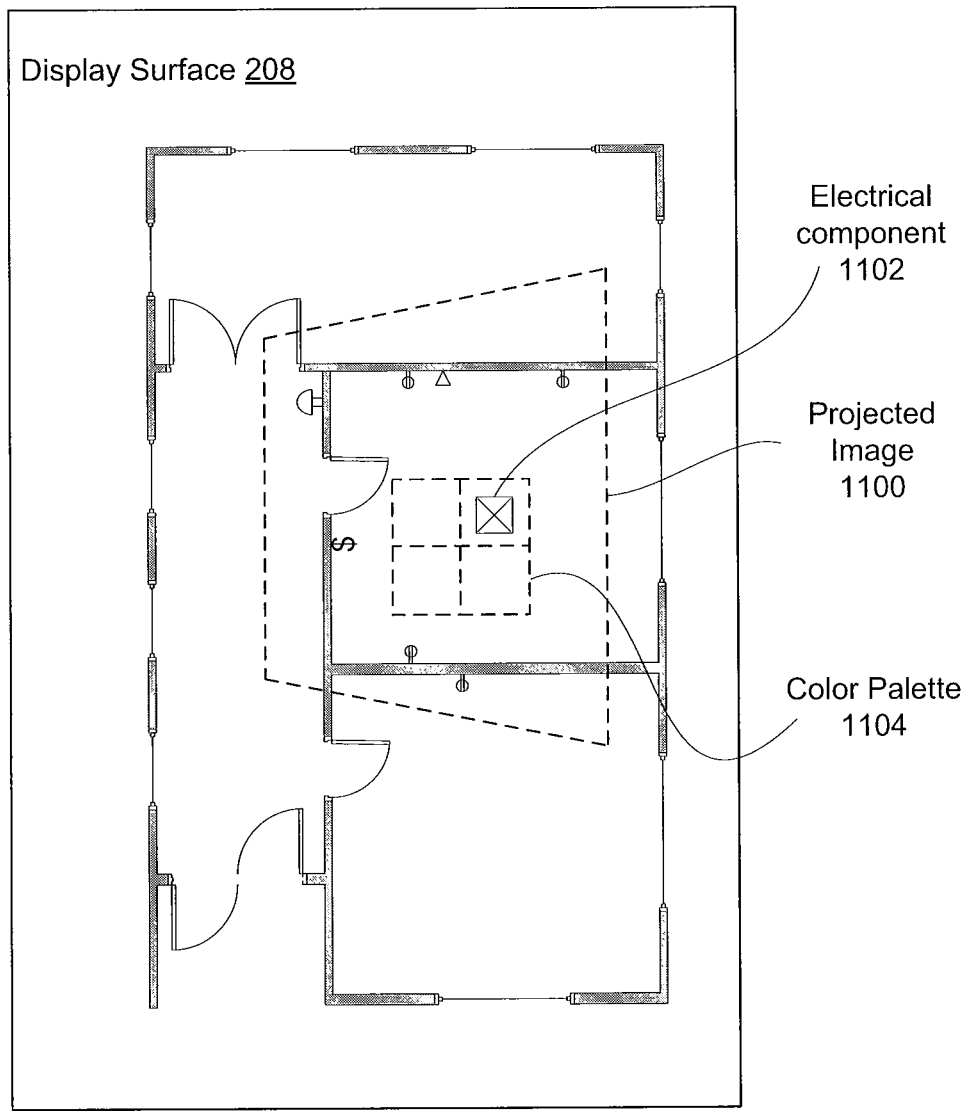
FIG. 11 illustrates a display surface that is overlaid with a projected image that includes a color palette according to one embodiment of the present invention.

FIG. 11 illustrates a display surface 208 that is overlaid with a projected image 1100 that includes a color palette 1104 according to one embodiment of the present invention. Here, each section of the color palette 1104 includes a unique border color. To change the property of a virtual display element, e.g., an electrical component 1102, the user first aligns the color palette 1104 on top of a display element included in printout database layer 270. Then, the user can tap on the electrical component 1102 through the color palette 1104 to change the color of the electrical component 1102. To simplify the manipulation, the color palette 1104 can be resized via scroll wheel 304. The color palette 1104 can also be relocated within projected image 1100 via a handle attached to the color palette 1104.

Figure 12:
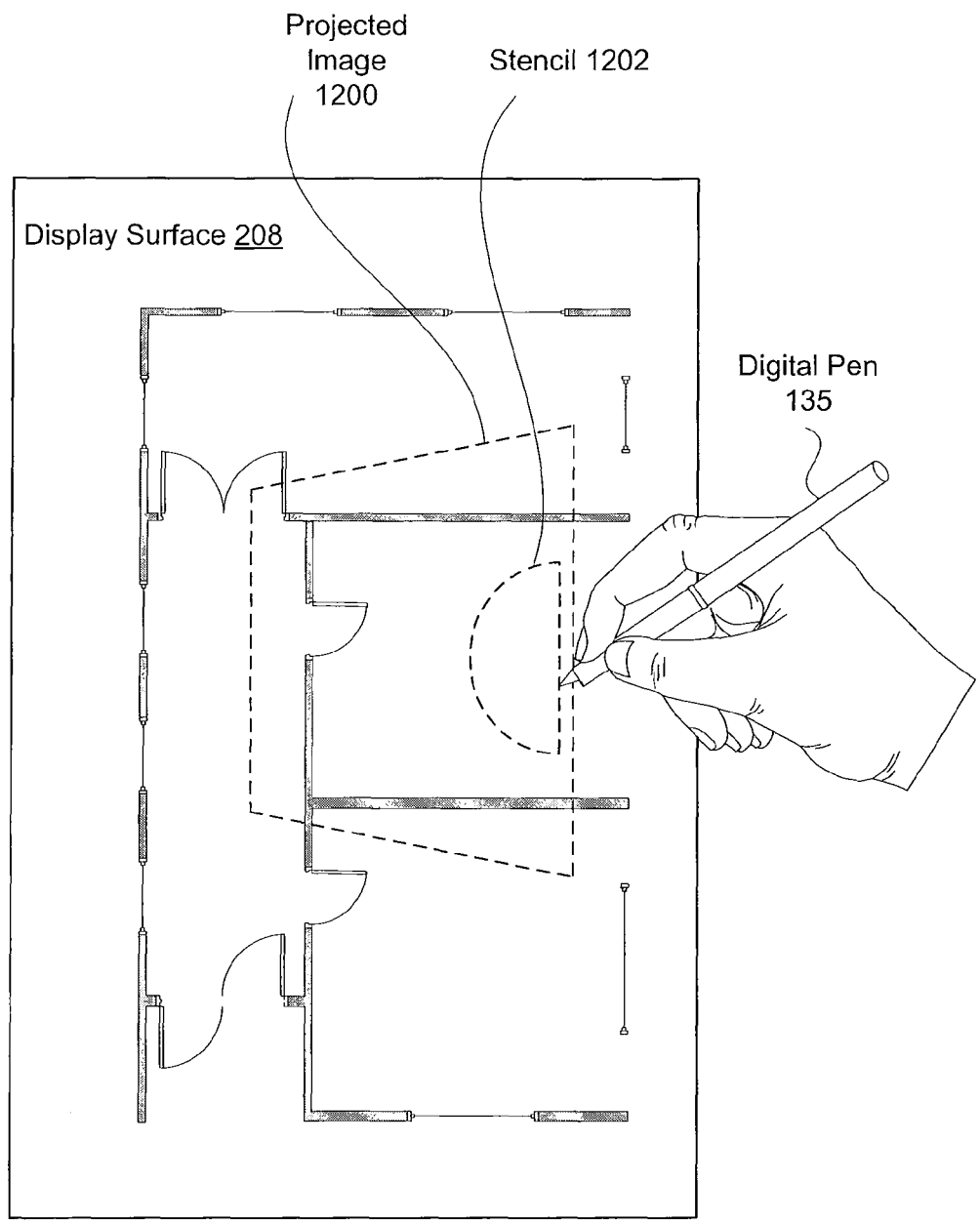
FIG. 12 illustrates a display surface that is overlaid with a projected image that includes a stencil according to an embodiment of the present invention.

FIG. 12 illustrates a display surface 208 that is overlaid with a projected image 1200 that includes a stencil 1202 according to an embodiment of the present invention. Here, the stencil 1202 is representative of any drafting tools that are used to guide a user when he or she is drawing across the display surface 208 using a digital pen 135. Like the color palette 1104, the stencil 1202 is resizable via the scroll wheel 304. In addition to the virtual ink that can be used to trace drawings, drafting and measurement palettes can also be used as virtual "stencils" that help users guide their physical pen strokes (i.e., ink strokes). In one embodiment, these stencils include rectangle and circle shape tools, a protractor, and French curves.

Figure 13:
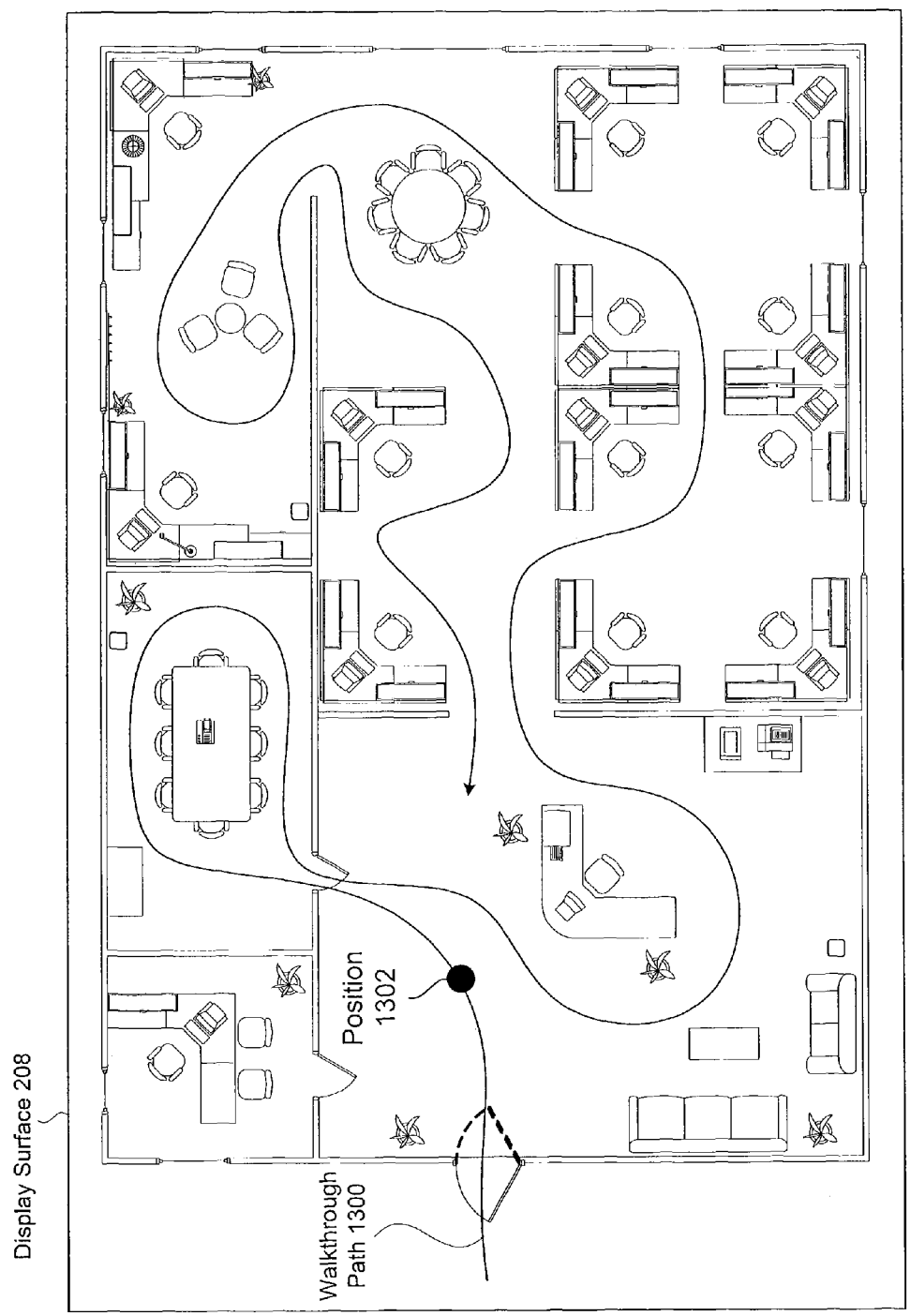
FIG. 13 illustrates generating a video walk-through of an environment based on strokes generated by a user via a digital pen according to one embodiment of the present invention.

FIG. 13 illustrates generating a video walk-through of an environment based on strokes generated by a user via a digital pen 135 according to one embodiment of the present invention. The user may draw a path, such as walkthrough path 1300, on the display surface 208 with the digital pen 135. Frames of the two-dimensional walk-through represented as pixel data, as viewed from a viewpoint moving along the walkthrough path 1300, are generated by the CPU 160 or the GPU 115 and stored in the image data 155 for playback as a walk-through animation. The playback may be projected onto the display surface 208 by the spatially-aware projector 132 and/or played back on alternative output devices, e.g., a liquid crystal display (LCD) monitor. As the frames are being displayed via spatially-aware projector 132, the position 1302 indicates the position along the walkthrough path 1300 that corresponds to the current frame that is displayed. Additionally, the walkthrough path 1300 and position 1302 may be used as a slide bar and slide bar position interface element, respectively, for the user to navigate a corresponding frame that he or she desires to view.

Figure 14:
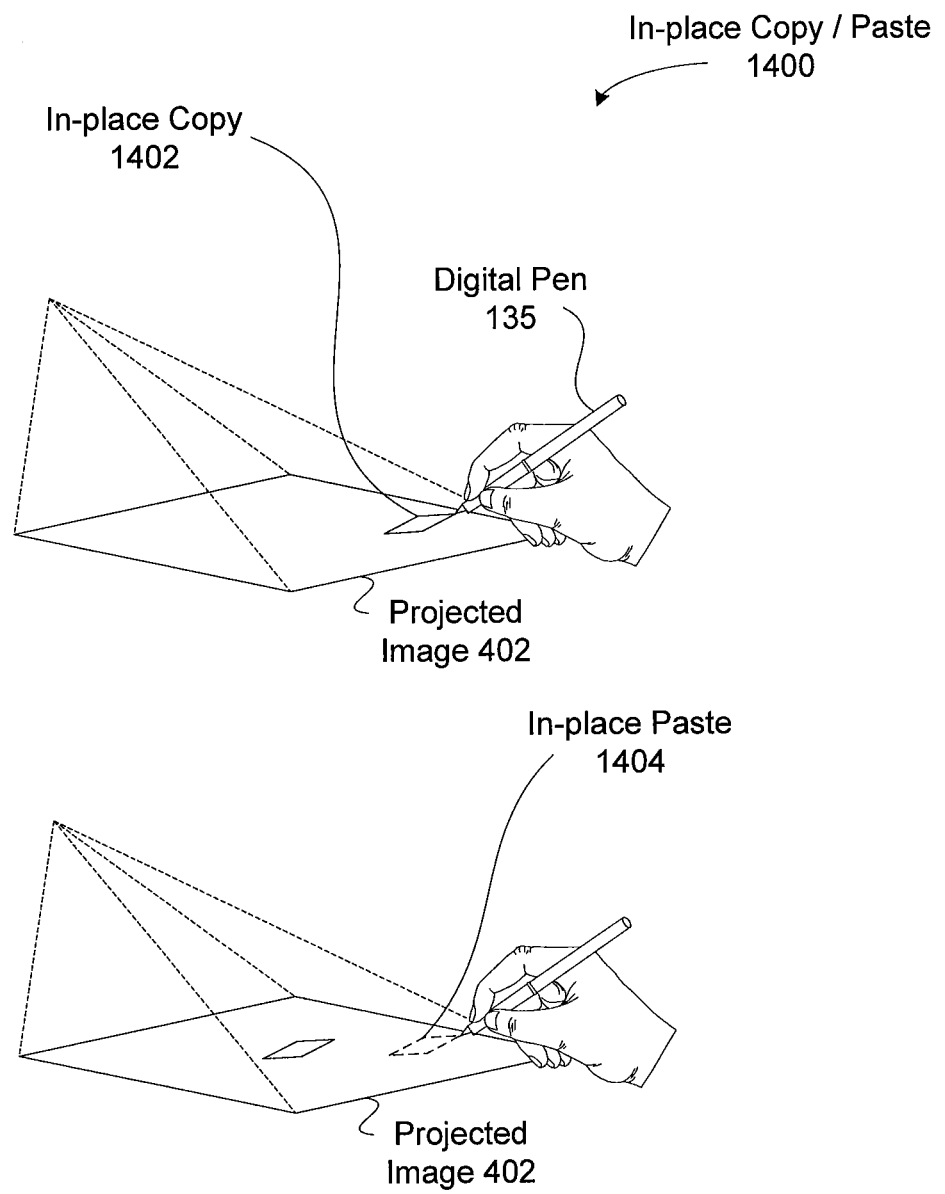
FIG. 14 illustrates an in-place copy/paste technique according to one or more embodiments of the invention.

FIG. 14 illustrates an in-place copy/paste technique 1400 according to one or more embodiments of the invention. As described above in conjunction with FIG. 4, independent input and output allows users to select different parts of the viewport layer 280 and to easily select menu display elements. When the copy and paste feature is activated, the user can use the viewport layer 280 as a clipboard to copy a display element, e.g., an electrical component 902, from one location to another within a display surface 208 that includes electrical component 902, or in another display surface 208. There are two steps involved when copying an display element from one location of a display surface 208 to another location. The user first copies the display element from the database layer 275 to the viewport layer 280. Then, users paste the display element into the desired location of the user database layer 275 by using in-place copy/paste technique 1400 or displaced copy/paste technique 1500 described in further detail below in conjunction with FIG. 15.

When performing an in-place copy/paste technique 1400, the object selection occurs within the viewport layer 280, and the in-place paste can occur from the database layer 275 to the viewport layer 280 thereby, which creates a hyperlink between the virtual display elements. The spatially-aware projector 132 is then repositioned to a desired paste location, whereupon the user can paste the copied display element from the viewport layer 280 to the database layer 275.

Figure 15:
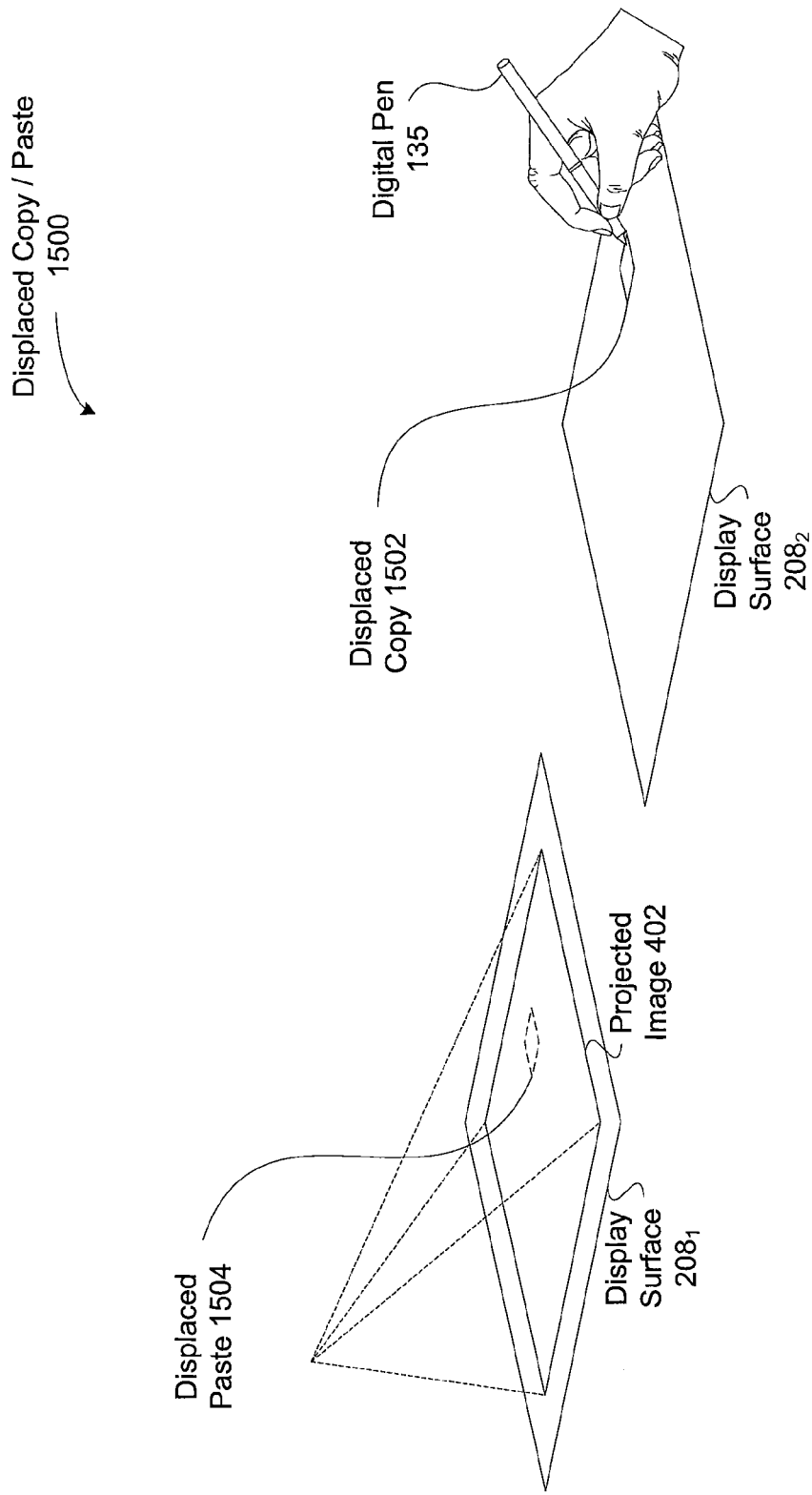
FIG. 15 illustrates a displaced copy/paste technique according to one or more embodiments of the invention.

FIG. 15 illustrates a displaced copy/paste technique 1500 according to one or more embodiments of the invention. As illustrated, when a display element that lies outside of the projected image 402 is selected, the displaced copy/paste technique 1500 is used. When the display element is selected and copied with the digital pen 135, its virtual representation is copied to the viewport layer 280, and an active hyperlink is created as described above. This active hyperlink enables the user to select the display element again using the dominant hand to access a contextual marking menu for the copied display element, where the contextual marking menu is displayed in the viewport layer 280. Selecting a paste submenu display element will paste the display element to the user database layer 275. Display elements can be copied from one layer to another because different contextual marking menus are shown depending on the underlying information layer. For example, if display elements are located in the user database layer 275, then a menu containing "copy" pops up so that the printout database layer 270 can be used as source of copy. Similarly, if a display element is located inside the viewport layer 280, a menu containing "paste" pops up. When the user transfers display elements to the viewport layer 280 or to the user database layer 275, different types of representations can be selected. The user may copy its raw digital representation using a "shape" submenu. If the user wants to copy an iconic representation that displays meta-data such as the direction to its original location within the display surface 208, the user can select an "icon" submenu. For error management, users can correct and undo their copy and paste operation using different techniques. In one example, users can select a "delete" submenu on display elements in user database and viewport layers. In another example, the user can reposition display elements within the viewport layer using the "move" submenu. Note that users can either move the digital pen 135, or move the spatially-aware projector 132 to change the relative location of the display element in the viewport coordinate system.

In-place and displaced manipulations are also available in the search functions described herein. When the search feature is activated, the user can execute a search by either writing or clicking the display element to be searched inside the projection area (in-place) or outside the projection area (displaced). When the user writes the display element to be searched, the pen strokes are gathered and translated into text that the CPU 130 is able to interpret. For example, if the user writes "wireless" on a separate display surface 208, and the projector is placed on top of a display surface 208 that corresponds to a college campus, then buildings with wireless support will be highlighted. If the projector is placed on top of a document, a text bounding box of the search results will be highlighted. If the result is inside the viewport, then the result is simply highlighted with an outline. If the result is outside the viewport, the halo technique may be used as described above in conjunction with FIG. 10. There are a variety of ways to initiate a search. For example, users can write a keyword, or lasso a phrase already written as part of an annotation, or lasso printed text. The search considers not only the printout database layer 275 but also display elements on the user database layer 275 that the user may have added while during previous interactions with a corresponding display surface 208.

Figure 16:
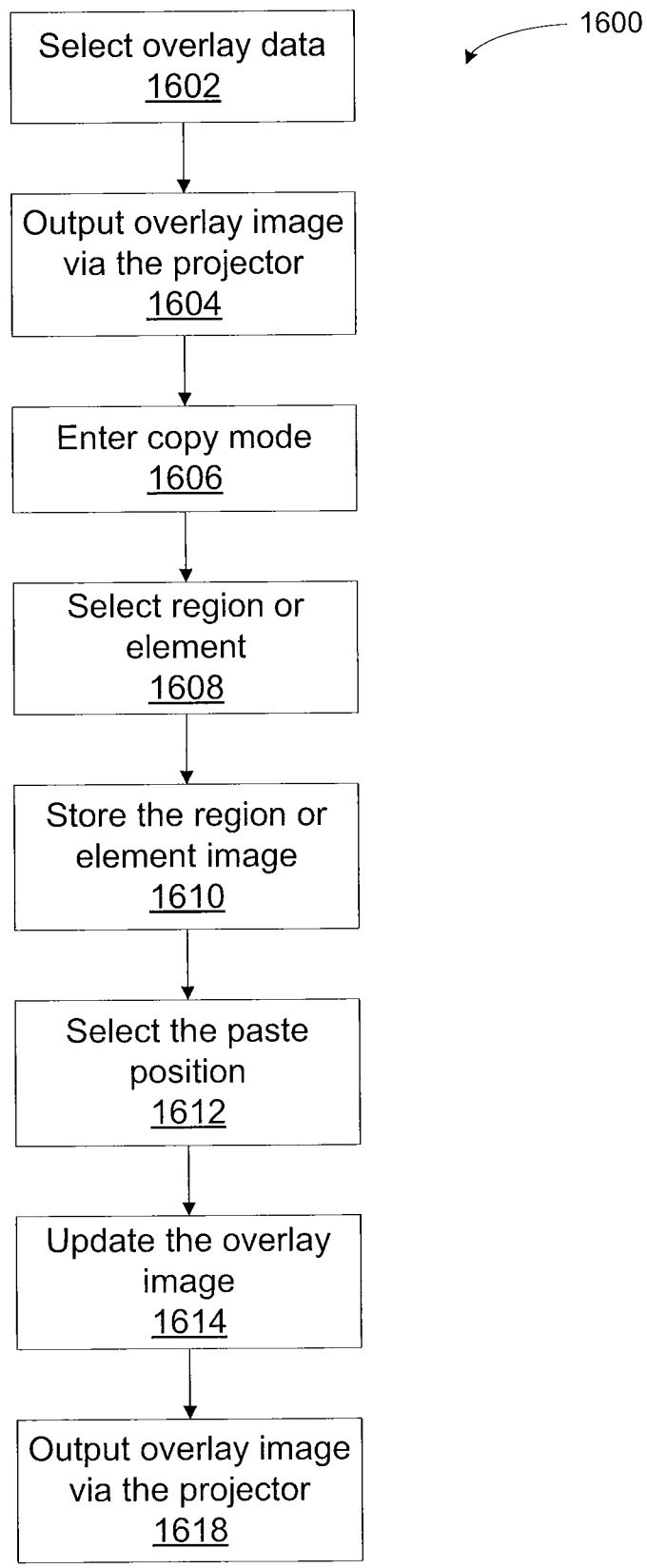
FIG. 16 illustrates a flow diagram of method steps for performing a copy and paste function according to one embodiment of the invention.

FIG. 16 illustrates a flow diagram of method steps 1600 for performing a copy and paste function according to one embodiment of the invention. The method begins with step 1602 where the user selects the overlay data to be displayed in the projected image 402. The data may be selected using the projected radial menu 802. At step 1604, the application program 112 updates the overlay data in the projected image 402 via the spatially-aware projector 132. At step 1606, the user activates a copy mode. At step 1608, the user selects a region or an element within the display surface 208 or the projected image 402. At step 1610, the application program 112 stores in memory within image data 155 an image of the copied region or element. At step 1612 the user selects a paste position within the display surface 208 using the spatially-aware projector 132. At step 1614, the application program 112 updates the overlay image to include the copied region or element. At step 1618 the updated overlay image is displayed via the spatially-aware projector 132, whereupon the user is able to complete the paste function as described above.

Figure 17:
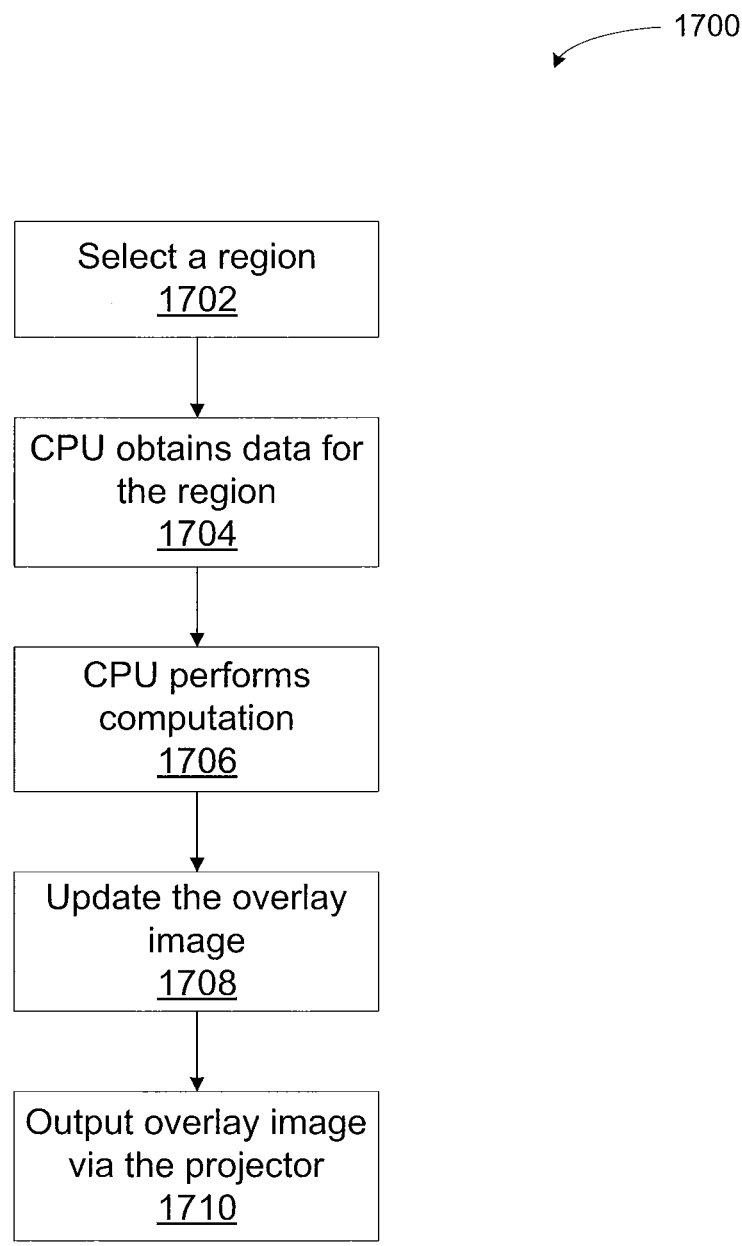
FIG. 17 illustrates a flow diagram of method steps for displaying overlay data for a computation according to one embodiment of the invention

FIG. 17 illustrates a flow diagram of method steps 1700 for displaying overlay data for a computation according to one embodiment of the invention. The method begins at step 1702 where the user selects a region or element on display surface 208 or within projected image 402 using the digital pen 135. At step 1704, the application program 112 obtains the data corresponding to the selected region or element. At step 1706, the application program 112 performs one or more computations specified by the user. At step 1708, the application program 112 updates the overlay image to include the computation result. At step 1710, the updated overlay image is displayed via the spatially-aware projector 132.

The printed content that is visible on the display surface is only one abstract view of a larger electronic file that is stored in the design data 150 within system memory 110. For example, when a two-dimensional floor plan is printed on the display surface 208, the digital pen 135 may directly access a highly detailed three-dimensional model that is stored as the design data 150 or image 155 or generated by the CPU 130 or GPU 115 using the design data 150. A view of the three-dimensional model may be displayed within the projected image 402 that is output by the spatially-aware projector 132.

In sum, the spatially-aware projector and digital pen enable the use of virtual ink in addition to conventional physical ink. The virtual ink may be used to capture commands, annotate an existing design, and communicate with a remote user. The virtual ink may be displayed as a projected image on a display surface by the spatially-aware projector. Auxiliary design information and rendered images may also be displayed in the projected image. The spatially-aware feature of the projector and digital pen allows for gestures to be interpreted differently based on the position of the spatially-aware projector and digital pen in a given space.

As a result, paper is no longer just a static source of data, but it is also used as the display surface and a dynamic workspace. Virtual ink benefits the user by providing visual feedback without permanently modifying the physical display surface. The spatially-aware projector and digital pen enable a user to interact with the design more efficiently and intuitively.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A spatially-aware projector system, comprising:
a first position tracking mechanism configured to provide first position data related to a current position of a projector within a display surface;
a second position tracking mechanism configured to provide second position data related to a current position of a spatially-aware digital pen within the display surface; and
the projector configured to:
display a projected image generated from design data retrieved from a memory based on the first position data;
receive drawing input via the second position tracking mechanism;
analyze the drawing input relative to the projected image;
update the design data based on the drawing input; and
display a radial user interface menu including a plurality of regions separated by boundaries, wherein a first region in the plurality of regions is selected based on the spatially-aware digital pen remaining fixed and in contact with the display surface while the projector is relocated.

2. The system of claim 1, further comprising a processor configured to or configurable to generate the projected image.

3. The system of claim 2, further comprising an enclosure configured to house the first position tracking mechanism and the projection unit.

4. The system of claim 3, wherein the enclosure further houses the processor.

5. The system of claim 3, wherein the enclosure is further configured to be grasped by a hand of a user such that the user can position the spatially-aware projector within the display surface.

6. The system of claim 5, further comprising an adjustable mirror for controlling the size of the projected image across the display surface.

7. The system of claim 6, further comprising a swivel that may be manipulated by a user to adjust the mirror to change the size of the projected image within the display surface.

8. The system of claim 5, further comprising a scrollwheel that, when rotated, causes the size of at least one element in the projected image to change.

9. The system of claim 1, wherein the spatially-aware digital pen further includes a force sensor that detects when the spatially-aware digital pen contacts the display surface.

10. The system of claim 9, further comprising a processor configured to update the projected image to include the radial user interface menu when the spatially-aware digital pen is contacted to and held in place against the display surface for a threshold amount of time.

11. The system of claim 10, wherein each of the regions included in the plurality of regions represents a different menu item included in the radial menu.

12. The system of claim 1, wherein selecting the first region in the plurality of regions is further based on a virtual cursor that is controlled by movements of the spatially-aware digital pen crossing a boundary delineating the first region while the spatially-aware digital pen remains fixed and in contact with the display surface.

13. The system of claim 9, wherein virtual ink strokes are collected and stored as image data in memory when the spatially-aware digital pen is contacted to and moved across the display surface.

14. The system of claim 13, further comprising a processor configured to update the projected image to include the image data.

15. The system of claim 1, wherein the spatially-aware digital pen selects an element that is outside of the boundaries of the projected image to produce a copy of the element.

16. The system of claim 15, further comprising a processor further configured to receive a paste position on the display surface and within the boundaries of the projected image and update the projected image to display the copy of the element at the paste position within the projected image.

17. The system of claim 5, wherein the processor is further configured to or configurable to:
update the projected image to display a plurality of user interface elements, wherein each user interface element is partially transparent and includes a border of a different color;
determine an element selected via the spatially-aware digital pen lies within the boundaries of a first user interface element included in the plurality of user interface elements; and
update the selected element to match the border color of the first user interface element.

18. The system of claim 1, further comprising a processor configured to render a sequence of frames of pixel data based on the design data and a drawing path captured by the spatially-aware digital pen to produce a walk-through animation of a three-dimensional model represented by the design data.

19. The system of claim 5, further comprising a network interface that is coupled to the processor and configured to interface with an additional spatially-aware digital pen operated by another user.

20. The system of claim 1, further comprising a mechanical controller that, when adjusted, changes a spread between each successive raster line produced by the projection unit.

21. A spatially-aware projector system, comprising:
a projector that includes a first position tracking mechanism configured to provide position data related to a current position of the projector within a display surface, the projector configured to display a projected image generated from design data retrieved from a memory based on the position data;
a spatially-aware digital pen that includes a second position tracking mechanism configured to provide position data related to a current position of the spatially-aware digital pen within the display surface; and
a processor coupled to the spatially-aware digital pen and configured to:
receive drawing input corresponding to a drawing path via the second position tracking mechanism;
analyze the drawing input relative to the projected image; and
render a sequence of frames of pixel data based on the design data and the drawing path to produce a walk-through animation of a three-dimensional model represented by the design data.

22. A spatially-aware projector system, comprising:
a first position tracking mechanism configured to provide position data related to a current position of the spatially-aware projector within a display surface;
a projection unit configured to display a projected image generated from design data retrieved from memory based on the position data;
a processor configured to or configurable to:
generate the projected image, and
update the projected image to include a radial user interface menu when the spatially-aware digital pen is contacted and held in place against the display surface for a threshold amount of time,
wherein the radial user interface includes a plurality of regions separated by boundaries such that each of the regions represents a different menu item included in the radial menu, and
wherein a first region in the plurality of regions is selected when the spatially-aware projector is relocated and the spatially aware digital pen remains fixed and in contact with the display surface causing a boundary delineating the first region to be crossed by a virtual cursor that is controlled by movements of the spatially-aware digital pen;
an enclosure configured to:
house the first position tracking mechanism and the projection unit, and be grasped by a hand of a user such that the user can position the spatially-aware digital pen that includes:
a second position tracking mechanism configured to provide position data related to a current position of the spatially-aware digital pen within the display surface, and
a force sensor that detects when the spatially-aware digital pen contacts the display surface.

* * * * *